United States Patent [19]

Weber et al.

[11] Patent Number: 4,519,677

[45] Date of Patent: May 28, 1985

[54] POWER-OPERATED VEHICLE MIRROR

[75] Inventors: Randall W. Weber; Charles A. Weber, both of Elkhart, Ind.

[73] Assignee: Bock Products, Inc., Elkhart, Ind.

[21] Appl. No.: 492,055

[22] Filed: May 6, 1983

[51] Int. Cl.³ .................................................. G02B 7/18
[52] U.S. Cl. ...................................... 350/637; 248/481
[58] Field of Search ................... 350/289; 248/481, 487

[56] References Cited

U.S. PATENT DOCUMENTS

| 2,656,764 | 10/1953 | Johnson | 350/289 |
| 3,063,342 | 11/1962 | Zeek | 350/289 |

FOREIGN PATENT DOCUMENTS

| 2431869 | 1/1976 | Fed. Rep. of Germany | 350/289 |
| 2502188 | 7/1976 | Fed. Rep. of Germany | 350/289 |
| 2736900 | 3/1979 | Fed. Rep. of Germany | 350/289 |
| 723549 | 3/1980 | U.S.S.R. | 350/289 |

Primary Examiner—Jon W. Henry
Attorney, Agent, or Firm—Marmaduke A. Hobbs

[57] ABSTRACT

A power-operated, exterior rear view mirror, normally mounted on each side of large or long vehicles, having motor assemblies within the mirror housing which provide adjustment capabilities in both visual planes, vertical and horizontal. The mirror can be mounted on the vehicle using the existing mounting hardware and can be wired into the existing electrical system of the vehicle. A remote-control switch, located inside the vehicle within easy reach of the driver, controls the adjustment of the mirror, making the task of adjusting the mirrors virtually effortless and providing for safer vehicle operation.

5 Claims, 4 Drawing Figures

POWER-OPERATED VEHICLE MIRROR

BACKGROUND OF THE INVENTION

Drivers of large or long vehicles, such as vans, RV's, semi-trailer trucks, or vehicles pulling trailers, rely heavily on their exterior rear-view mirrors. These mirrors are normally located on or near the front doors of the vehicle, one to each side, and afford the driver a view of the areas adjacent and behind the vehicle. Such mirrors are an invaluable aid in turning, backing the vehicle, passing other vehicles, and changing lanes on city streets and on highways. Adjusting the mirrors before proceeding to operate the vehicle is a necessity for safe operation and involves making a preliminary manual adjustment, returning to the driver's seat to check the view, and then adjusting again if necessary. This sequence is repeated until proper adjustment is reached and may require several repetitions. This adjustment procedure is cumbersome, time-consuming, and easily overlooked by drivers who are careless or in a hurry, in favor of leaning forward, backward or sideways in the seat to obtain a clear view, thus jeopardizing their safety and the safety of other drivers.

One device which solves some of the above problems has been disclosed in our co-pending application, Ser. No. 439,825, filed Nov. 8, 1982, now U.S. Pat. No. 4,464,016, issued Aug. 7, 1984, for a Power-Adjusted Vehicle Mirror. This device is controlled from a remote switch located within easy reach of a driver seated in the normal driving position and turns the mirror from side to side, either toward or away from the vehicle. This device finds its primary application with mirrors having a length sufficient to encompass the vertical field of view, although it can be used in other applications also. However, where mirrors with insufficient length to encompass the vertical field are used, adjustability in both visual planes, vertical and horizontal, is a requirement for safe operation of the vehicle.

SUMMARY OF THE INVENTION

It is, therefore, one of the principal objects of the present invention to provide a power-operated exterior rear view mirror for large or long vehicles in which the mirror surface can be tilted upwardly, downwardly, angularly, and to either the right or left side, and which is controlled by a remote-control switch located inside the vehicle within easy reach of the driver while seated in the normal driving position.

Another object of this invention is to provide for safer operation of vehicles of this type by making virtually effortless the task of adjusting the position of the exterior rear-view mirrors and eliminating the need to guess at a preliminary adjustment, return to the driving position to check the view, and possibly repeat this sequence until the proper adjustment is reached.

A further object of this invention is to provide a power-operated vehicle mirror which can be easily installed on a vehicle using the existing mounting hardware and which can be wired into the existing electrical system of the vehicle, thus avoiding costly modifications.

These and other objects are attained by the present invention which relates to a power-adjusted exterior rear-view mirror for large or long vehicles, preferably including a housing having therein a bracket for securing the mirror to the conventional mounting hardware provided on the vehicle. Motor means inside the housing cause rotation of a cam means which abuts and exerts pressure on a cam follower means that is pivotally mounted and has an outwardly facing mirror plate. The pressure exerted on the cam follower means by the cam means causes the mirror plate to tilt upwardly, downwardly, to the right or left, or to any of the various angular positions therebetween, in conjunction with a resilient means, such as a spring, the opposing forces provided by the motor means and the resilient means serving to adjust the mirror. Adjustment of the mirror is accomplished from inside the vehicle using a remote-control switch located so as to be within easy reach of the driver's seat. A mirror is normally provided on each side of the vehicle, usually located on or directly in front of the front doors of the vehicle.

DETAILED DESCRIPTION OF THE PREFERRED EMBODIMENT

Figure 1:
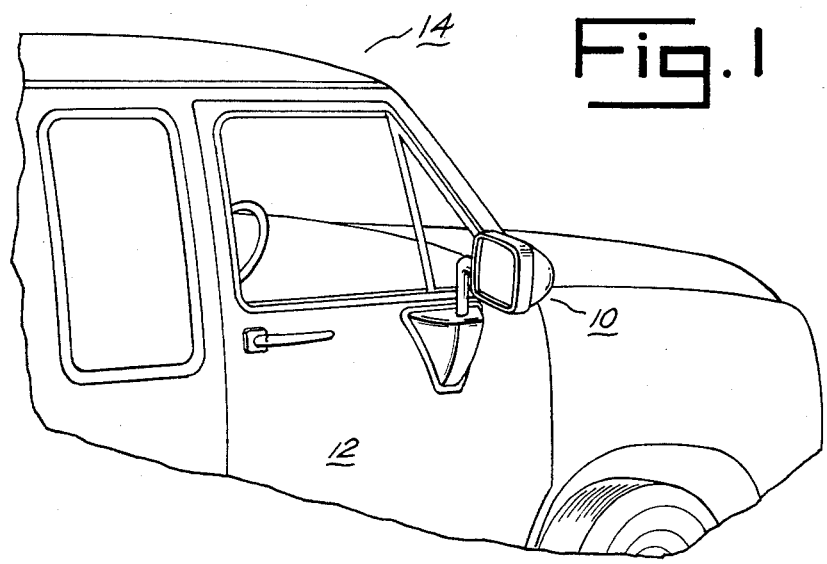
FIG. 1 is a fragmentary perspective view of the power-operated vehicle mirror embodying the present invention, shown here mounted on the door of a van.

Referring more specifically to the drawings, and to FIG. 1 in particular, numeral 10 designates generally the power-operated vehicle mirror assembly embodying the present invention, shown here mounted on a door 12 of a van 14. It is to be understood that the vehicle shown and the placement of the power-operated mirror on the vehicle are for illustration purposes only. The present invention may be adapted for use on a wide variety of vehicles, with the size of the power-operated mirror and its placement on the vehicle variable depending on the particular requirements of the vehicle itself and the location on the vehicle of the existing mounting hardware. A mirror is normally provided on both sides of the vehicle, with the adjustment of the mirrors being accomplished from inside the vehicle cab while the driver is seated in a normal driving position. The following description and drawings relate to the mirror designed for the passenger's side of the vehicle.

Figure 2:
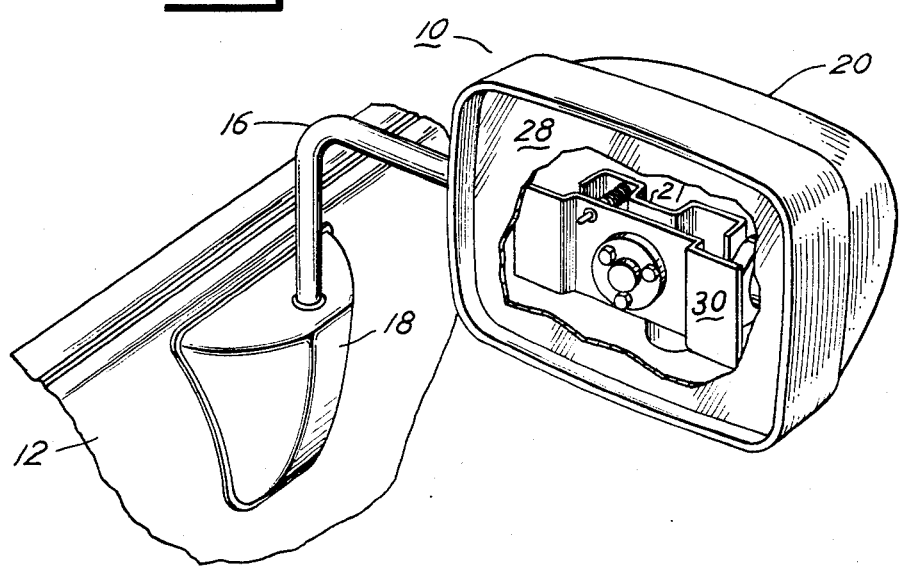
FIG. 2 is an enlarged, fragmentary perspective view of the power-operated vehicle mirror, shown here with a portion of the mirror surface broken away, revealing the adjustment mechanism.

In FIG. 2, the mirror assembly 10 is shown mounted on the passenger's side door 12, suspended by a rod 16 which is secured within a conventional mounting assembly 18, normally installed on each side of the vehicle. A mirror housing 20, specially designed to accommodate the placement therein of the adjustment mechanism, is secured to the rod by nut 22, together with a bracket means such as bracket 21 which supports the adjustment mechanism. Bolt 24 with nut 26 has been inserted through the rod, thereby preventing rotation of the mirror assembly. Slightly recessed within the open front end of the housing is a glass mirror plate 28 of sufficient dimension to allow clearance between the four outer edges of the mirror plate and the inner surface of the housing, thus allowing freedom of movement of the mirror plate. The mirror plate is attached to a cam follower means or backing plate 30 which also serves as an abutment means against which the adjustment mechanism exerts force to cause changes in the relative position of the mirror plate. Extending perpendicularly from bracket 21 is a support means or post 40 with a threaded end 42 for securing the post to the bracket using nut 44. The opposite end of the post has a swivel means or ball joint 46 around which backing plate 30 is secured by bolts 48 with nuts 50. Clearance has been provided around the ball joint to permit the backing plate and the attached mirror plate to tilt upwardly, downwardly, angularly, and to either the right or the left side.

The adjustment mechanism of the present invention includes a first motor assembly 52, secured to bracket 21 by a plurality of bolts 54 with nuts 56, and a second motor assembly 58, secured to the bracket by a plurality of bolts 60 with nuts 62. First motor assembly 52 includes a first motor 80 connected to a first speed reducer 82, which is geared to convert the relatively high speed of the motor into a slow and steady rotation suitable for adjusting the position of the mirror. The first speed reducer turns a first drive shaft 84 which is connected to a cam means or first eccentric adjusting wheel 86 and which is offset from the center of the first wheel so that, as the first shaft turns the wheel, an elliptical form of rotation is obtained. The first eccentric wheel has a wide portion and a narrow portion due to its offset center drive shaft, and abuts the backing plate 30 near the outer edge so that, in the embodiment shown, when the wide portion is abutting the backing plate, the backing plate and mirror plate are tilted toward the vehicle. As the first wheel rotates further and the narrow portion is abutting the backing plate, the backing plate and mirror plate are tilted away from the vehicle, urged by a resilient means, such as a spring 88, which is disposed around a pin 90. The pin is secured to the bracket in the upper vehicle side corner by a nut 92 and extends outwardly, substantially perpendicular to the bracket and through backing plate 30, holding the spring therebetween. The orientation of the pin and spring assembly and the eccentric adjusting wheels has been designed so that the spring urges the backing plate into contact with the wheels. The backing plate is pivotally mounted near the intersection of lines projected on the axes of the drive shafts, and the spring has been positioned from both of the shafts at an angle greater than ninety degrees around the ball joint.

Similar action is produced by the second motor assembly 58 which includes a second motor 94 connected to a second speed reducer 96 which is geared to convert the relatively high speed of the motor into a slow and steady rotation suitable for adjusting the position of the mirror. The second speed reducer turns a second drive shaft 98 which is connected to a cam means or second eccentric adjusting wheel 100 and offset from the center of the second wheel so that, as the second shaft turns the second wheel, an elliptical form of rotation is obtained. The second eccentric wheel also has a wide portion and a narrow portion due to its offset center drive shaft and abuts the backing plate 30 near the lower edge. When the wide portion is abutting the backing plate, the backing plate and the attached mirror plate are tilted upwardly. As the second wheel rotates further and the narrow portion abuts the backing plate, the backing plate and attached mirror plate are tilted downwardly, urged by the spring 88. The spring thus works in conjunction with the two motor assemblies to cause changes in the position of the mirror. In this embodiment, the adjusting wheels rotate in only one direction when activated; for example, the mirror moves from side to side in a continuous motion when the first wheel is activated, urged toward the vehicle by the wide portion of the first wheel and urged away from the vehicle by the spring as the wide portion rotates away from the backing plate and the narrow portion abuts the backing plate. The spring keeps the backing plate in contact with both adjusting wheels and also provides a measure of protection by giving way to a force applied rearwardly to the mirror plate from the inner top or the inner vehicle edge.

A multi-position control switch (not shown) is located inside the driving compartment within easy reach of the driver when seated in the normal driving position, and is connected to the motor by wires or cords normally disposed in rod 16. The switch has eight operative positions, up, down, right, left, and the four angular positions therebetween. When the switch is held on in the up position, for example, the second adjusting wheel 100 urges the mirror to tilt upwardly and then downwardly in a slow, steady, and continuous motion, urged by the second wheel and the spring. When the switch is moved to an angular position, for example, the position between left and down, both motor assemblies are activated and the backing plate and its attached mirror plate are tilted to the left and downwardly. This allows fine, angular adjustments to be made in the mirror's position and provides the driver with full viewing range in both visual planes, vertical and horizontal. Other angular positions of the mirror are obtained by similarly positioning the switch to operate one or both of the motor assemblies.

In the use and operation of the power-operated vehicle mirror embodying the present invention, the mirror assembly 10 is mounted on the vehicle, normally one to each side, using the existing, conventional mounting hardware to secure the rod 16 which supports the mirror assembly. The size of the power-operated mirror and its location on the vehicle will be determined by the requirements of the particular vehicle. The power cords for the motor assemblies 52 and 58 are routed into the vehicle in a convenient manner and wired into the existing electrical system of the vehicle, and the remote-control switch or switches are mounted inside the vehicle within easy reach of a driver seated in the normal driving position. Upon activation of the first motor assembly 52 by moving the remote-control switch to the right or to the left, the first eccentric wheel 86, which abuts the backing plate 30 near the outer edge thereof, rotates by way of its offset-from-center first drive shaft 84. Due to the offset center shaft, the wheel has a wide portion and a narrow portion, and when the wide portion is abutting the backing plate, the backing plate and mirror plate are urged toward the vehicle, compressing the spring 88. If the switch is held in an on position, the first wheel continues to rotate in a slow, steady manner, and as the narrow portion of the first wheel abuts the backing plate, the backing plate and mirror plate are urged away from the vehicle by the compressed spring.

Upon activation of the second motor assembly 58 by moving the remote-control switch up or down, the second eccentric wheel 100, which abuts the backing plate 30 near the lower edge thereof, rotates by way of its offset-from-center second drive shaft 98, the backing plate pivoting on ball-joint 46 to the desired angular position. Due to its offset center shaft, the second wheel has a wide portion and a narrow portion, and when the wide portion is abutting the backing plate, the backing plate and mirror plate are tilted upwardly, compressing the spring. If the switch is held in an on position, the second wheel continues to rotate, and as the narrow portion abuts the backing plate, the backing plate and the attached mirror plate are urged downwardly by the compressed spring. When the remote-control switch is moved to one of the angular positions, for example, between down and left, both motor assemblies are activated to urge the backing plate and the attached mirror plate downwardly and to the left, in conjunction with the spring, thus enabling the operator of the vehicle to make fine, angular adjustments.

Figure 3:
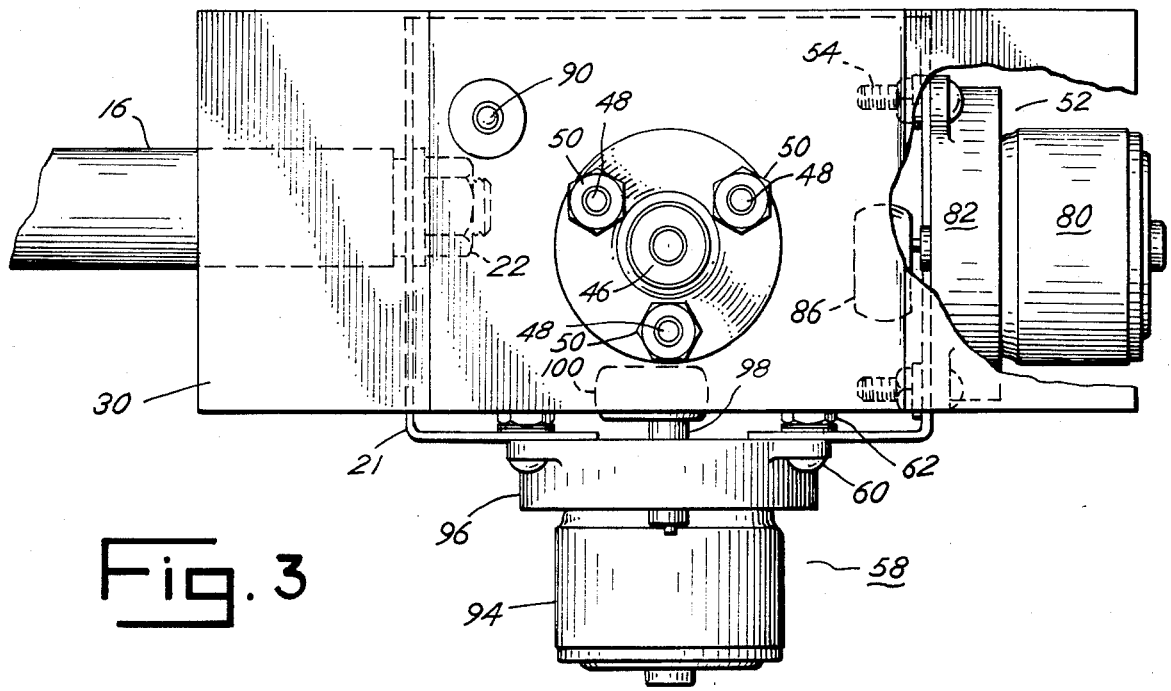
FIG. 3 is a front elevational view of the adjustment mechanism of the present invention with the mirror plate removed and a portion of the mirror backing plate broken away, revealing one of the motor assemblies.
Figure 4:
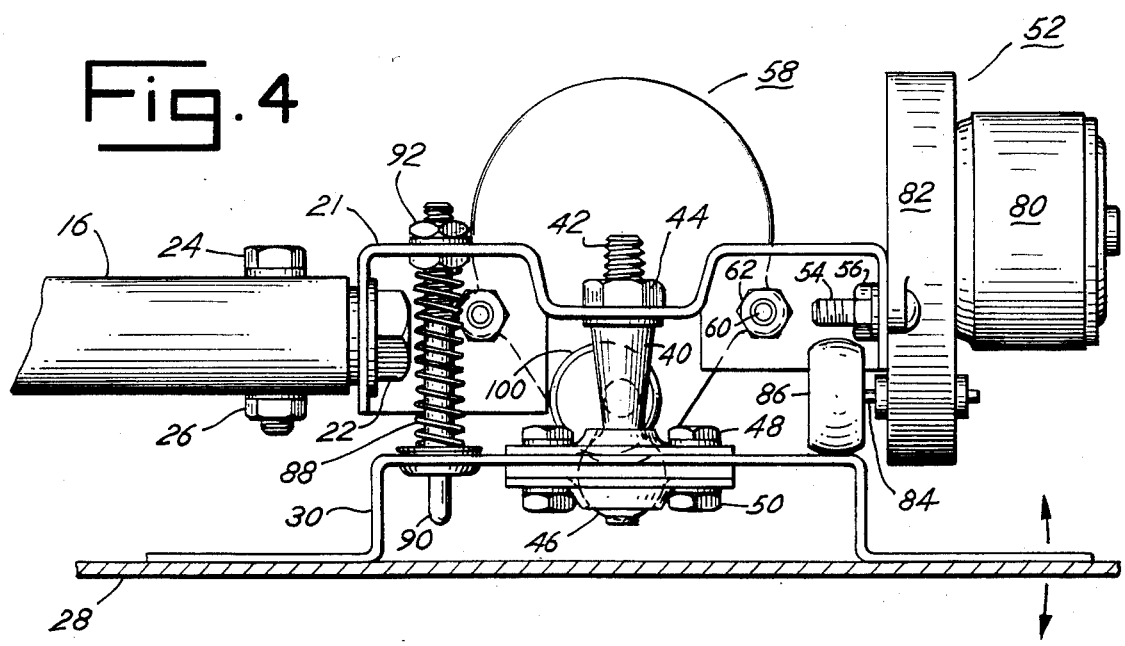
FIG. 4 is a top plan view of the adjustment mechanism shown in the preceding figure, the mirror surface being shown here in cross-section and the arrows indicating two of the possible adjustment directions.

The power-operated mirror shown in the drawings and described in detail herein has been designed for placement on the passenger's side of a vehicle. The mirror designed for the driver's side of the vehicle has the same features but in opposite configurations, i.e. rod 16 and the spring and pin assembly, 88 and 90, are moved to the right hand side, and motor assembly 52 is moved to the left hand side of the mechanism, as viewed in FIGS. 2 and 3, the rest of the mechanism remaining essentially the same as shown.

While only one embodiment of a power-operated vehicle mirror has been shown and described in detail herein, various changes and modifications may be made without departing from the scope of the invention.

I claim:

1. A power-operated mirror for mounting on a vehicle, comprising a housing, a bracket in said housing, a cam follower means having an outwardly facing mirror plate forming one side of said housing, a post secured to said bracket and extending outwardly substantially perpendicular to said bracket, a ball joint disposed on the end of said post opposite said bracket pivotally connecting said cam follower to said post, said cam follower means including a backing plate pivotally mounted on said ball joint and having said mirror plate secured to the outer surface thereof, a pair of cam means disposed at substantially right angles to one another around said post and abutting said cam follower means, a motor means for each of said cam means for changing the position of said mirror plate relative to said vehicle on at least two axes, and a resilient means disposed from both of said cam means at an angle greater than 90 degrees around said ball joint yieldably urging said cam follower means against said cam means, and including a pin secured to said bracket and extending toward said backing plate and a spring disposed around said pin between said bracket and said backing plate.

2. A power-operated mirror as defined in claim 1 in which said pair of cam means includes a first eccentric wheel abutting said cam follower means near the outer edge thereof and a second eccentric wheel abutting said cam follower means at substantially right angles to said first eccentric wheel.

3. A power-operated mirror as defined in claim 2 in which said first wheel has a first drive shaft offset from the center thereof and said second wheel has a second drive shaft offset from the center thereof, said drive shafts being connected to the respective motor means.

4. A power-operated mirror as defined in claim 3 in which one of said motor means includes a first motor with a first speed reducer connected thereto for rotating said first drive shaft and said first wheel, and the other of said motor means includes a second motor with a second speed reducer being connected thereto for rotating said second drive shaft and said second wheel.

5. A power-operated mirror as defined in claim 3 in which one of said motor means includes a first motor with a first speed reducer connected thereto, said first speed reducer being connected to said first drive shaft for rotating said first wheel for tilting said mirror plate toward and away from the vehicle in conjunction with said resilient means, and the other of said motor means includes a second motor with a second speed reducer connected thereto, said second speed reducer being connected to said second drive shaft for rotating said second wheel for tilting said mirror plate upwardly and downwardly in conjunction with said resilient means.

* * * * *